July 1, 1924.
R. A. HERA
STOP AND CHECK VALVE
Filed Sept. 29, 1921
1,499,578
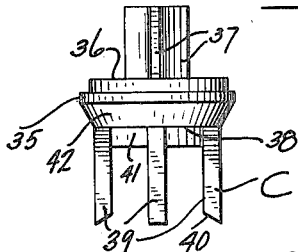
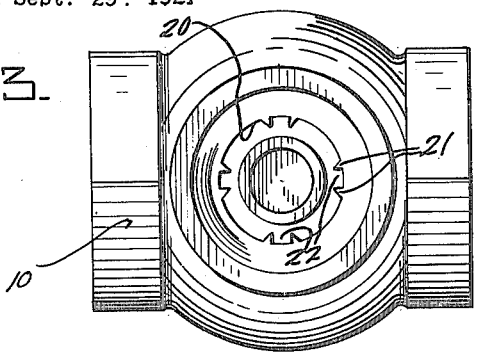
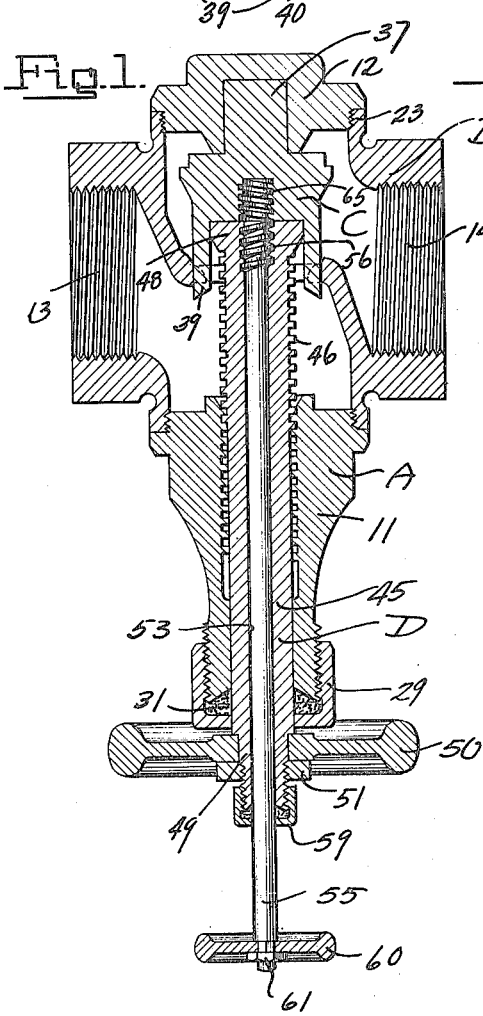
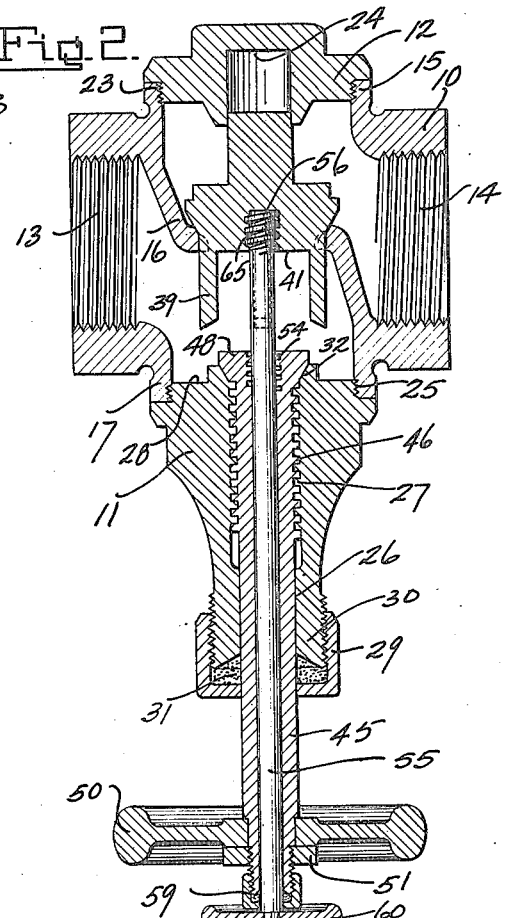
Inventor
Robert A. Hera
By Lancaster and Allwine
Attorneys Patented July 1, 1924.

1,499,578

UNITED STATES PATENT OFFICE.

ROBERT A. HERA, OF CONNERSVILLE, INDIANA.

STOP AND CHECK VALVE.

Application filed September 29, 1921. Serial No. 504,034.

*To all whom it may concern:*

Be it known that I, ROBERT A. HERA, a citizen of the United States, residing at Connersville, in the county of Fayette and State of Indiana, have invented certain new and useful Improvements in Stop and Check Valves, of which the following is a specification.

This invention relates to improvements in valve constructions, to provide a structure capable of selectively acting as a stop or check valve.

The primary object of the invention is the provision of a selectively operated stop or check valve of novel construction, and of such positive effectiveness as to adapt the same for a variety of uses.

A further object of the invention is the provision of a valve construction embodying the above mentioned features, the valve member thereof being particularly designed for effective use as a check valve member; said valve construction including means for detachably engaging with said valve member, whereby said valve construction may be utilized as a stop valve.

Other objects and advantages will be apparent during the course of the following detailed description.

In the drawings, wherein similar reference characters designate corresponding parts throughout the several views.

Figure 1 is a cross sectional view through the improved valve construction, and showing the valve member thereof held in open position.

Figure 2 is a cross sectional view taken through the improved valve construction, and showing the valve member thereof in positive locked closed position.

Figure 3 is a plan view of a portion of the valve casing, and showing the interior construction of the valve seat.

Figure 4 is a side elevation of the improved type of valve member used in the valve construction.

In the drawing, wherein for the purpose of illustration is shown the preferred embodiment of my invention, the letter A designates a valve construction, including the valve casing B; valve member C, and control means D.

The casing B preferably includes the body casing 10, the bonnet structure 11 and the cap 12. The body casing 10 is preferably of the globe type although the same may be of the angle or cross types. It is provided with an entrance opening 13, and an axially aligning exit opening 14. One side of said body casing 10 is provided with the internally screw threaded portion 15, whereby access may be had to the partition 16 which forms the valve seat interiorly of the casing 10, as is the case in ordinary valve formation. The opening defined by projection 15 is of course provided for reception of the detachable cap 12. An internally screw threaded projecting portion 17 is provided in axial alignment with the portion 15, the same defining an opening in the casing 10, and which faces the side of the partition 16, opposite to that side facing the opening defined by the portion 15. The screw threaded portion 17 is provided for detachably receiving the bonnet structure 11, to be subsequently described. The partition 16 is provided with a valve opening 20 axially aligning with the openings in projections 15 and 17, the wall of said circular opening 20 having spaced lugs 21 projecting inwardly thereof in pointed manner, to provide a plurality of substantially rectangular slots 22, of similar formation, and for cooperation with certain portions of the valve member C to be subsequently described.

A cap 12 is provided with the internally screw threaded shank 23 adapted for engaging in the aperture defined by the projection 15 of casing 10, said cap 12 having a socket depression 24 formed from the interior surface thereof and adapted for aligning axially with the opening 20, when said cap 12 is positioned upon casing 10.

The bonnet 11 of the valve structure A is provided with the screw threaded shank 25, adapted for engagement in the opening defined by projection 17 of casing 10, and whereby said valve bonnet 11 may be detachably assembled to the valve construction. An axial opening 26 is provided centrally through the bonnet structure 11, said opening 26 being axially positioned with respect to the opening 20 of the valve casing 10. The opening 26 is internally screw threaded as at 27, inwardly from its inner face 28 and extending for substantially three quarters of the length of said opening 26, said screw threads terminating short of the adjustable packing nut 29, which engages the screw threads upon the outer end 30 of the bonnet 11 whereby packing material of any suitable composition 31 may be provided upon the outer end of the bonnet 11 and intermediate the same and the packing nut 29. An annular bevelled seat 32 is provided upon the inner face 28 of the bonnet 11, which is disposed in said casing 10, when the bonnet 11 is connected thereto, said bevelled seat 32 flaring outwardly toward the face 28 and annularly about the opening 26.

The valve member C is of special construction and is preferably of the disc type, including the disc body portion 35. One flattened face 36 of the disc portion 35 is centrally provided with a plurality of connected ribs 37, extending in radial manner; said ribs 37 all extending for the same distance from the extended axis of the disc 35 and adapted for seating within the socket portion 24 of the cap member 12, when the valve is unseated. The opposite flat face 38 of the disc portion 35 is provided upon the marginal edges thereof with spaced projecting guide lugs 39, having the extreme outer ends thereof bevelled as at 40. A reinforcing section of metal 41 is provided upon the face 38, and connecting the lugs 39 for reinforcing purposes. The disc portion 35 is provided with a bevelled seating surface 42, tapering inwardly toward the side 38 of the disc 35, and adapted for seating in the annular seat surrounding the opening 20 provided in the partition 16.

The valve member C is assembled from the opening provided by the projection 15 on the casing 10, the fingers or lugs 39 thereof being reciprocably disposed in the ways 22 provided by the projections 21 extending inwardly in the seat opening 20, and until the bevelled surface 42 of said valve member C engages the seat in the partition 16 surrounding the opening 20 as illustrated in Figure 2. The valve construction A is preferably adapted for use in a hanging position such as illustrated in Figure 2, whereby the cap 12 is disposed upwardly, and the bonnet structure 11 depending as illustrated therein. In this position, the valve member C is of course normally operated by gravity, to seat itself upon the seat in the partition 16 of the casing 10. When the cap 12 is mounted, as above described, the ribs 37 of valve member C extend for reciprocation within the socket 24 provided therein. Thus, the valve member C is adapted for reciprocation within the opening in partition 16 and the cap 12, as can be readily seen from Figure 2. In this manner, the valve C provides a check valve structure.

The regulating means D is provided when adapting the valve construction A for functioning as a stop valve. The same preferably includes a main step 45 externally screw threaded as at 46, upon one end thereof, said screw threads being provided for engaging the internal screw threads 27 of the bonnet 11. The end of the stem 45 adjacent the screw threads 46, is provided with an enlarged bevelled head 48 adapted for seating upon the bevelled surface 32 provided in the bonnet 11. The main stem 45, is provided upon the end opposite the head 48 with a reduced shank 49, adapted for receiving a hand wheel 50 to be detachably mounted upon a shoulder of said reduced portion 49 by a detachable nut 51, which engages a screw threaded portion of this reduced portion 49. It can readily be seen that the detachable packing nut 29 and the packing material 31 as above described for use upon the bonnet structure 11, is in fact provided for engaging the smooth surface of the main stem 45, to provide a leak proof joint, whereby the main stem 45 can be advanced inwardly of the casing 10 in a manner to be subsequently set forth. The main stem 45 is hollowed, to provide the axial opening 53 extending longitudinally therethrough, the inner end of said opening 53 adjacent the enlarged head 48 being provided with the internally screw threaded socket portion 54.

An auxiliary stem 55 is provided for reciprocation within the bore or opening 53 of the main stem 45, and is provided upon the end thereof with screw threads 56 adapted for detachably engaging in the socket screw thread portion 54 of the main stem 45, whereby the auxiliary and main stems 55 and 45 respectively may be detachably clamped in locked position. A packing nut structure 59 is provided upon the reduced screw threaded portion 49 of stem 45 and adapted to have the packing material thereof engage the auxiliary stem 55, to provide a leak proof joint. The extreme outer or external end of the stem 55 is provided with a hand wheel 60, detachably maintained thereon as by the means 61.

In operation, when desiring to use the improved valve structure A as a check valve, the screw threaded portion 56 of the auxiliary stem 55 is threaded into the socket 54 provided in the main stem 45, and whereby the main and auxiliary stems are locked together as illustrated in Figure 1. In this position, liquid or other material in the valve structure is prevented from seeping past the screw threaded portion 54, to a great extent, the packing nut structure 59 preventing further loss of material to be conveyed in the valve construction A. The main stem 45 is adjusted, in such manner that the bevelled headed portion 48 thereof is seated in the bevelled portion 32 of the bonnet 11, substantially as described above, whereby a leak proof connection is provided as to the main and auxiliary stems of the control means D. In this position, the valve member C normally rests upon the seat in the partition 16, as above described. As the fluid in the valve structure A enters the entrance opening 13, the same lifts the valve member C, guided upwardly and against relative rotation in its seat, whereby said fluid may exit through the opening 14 and be prevented from returning, due to back pressure upon the valve member C, and likewise to the fact that the same is operated by gravity to normally seat itself upon the seat in the partition 16.

When desiring to lock the valve member C upon its seat to prevent passage of material through the valve structure A, the screw threaded portion 56 of the auxiliary stem 55 is adjusted into the screw thread socket 65 provided inwardly of the reinforcing portion 41 and face 38 of valve member C, thus locking the auxiliary stem 55 and valve member C together for reciprocation. As the main stem 45 is rotated in its seat in the bonnet 11 until the enlarged head portion 48 is seated on the bevelled surface 32, the packing nut 59 thereof, engages the hand wheel 60 of the auxiliary stem 55, thus locking the auxiliary stem 55 against any inward reciprocation and holding the valve member C securely upon its seat as can be readily seen.

When desiring to lift the valve member C off its seat, it is merely necessary to rotate the main stem 45 in the bonnet 11, until the enlarged end 48 thereof engages the reinforcing portion 41 of the valve C, and whereby said valve member C may be lifted off of its seat to permit free passage of any material through the valve construction A.

It can thus be seen that a device has been provided, in which parts thereof cooperate in effective manner to permit the valve structure to function as a check valve or a stop valve. The valve member C is particularly designed to cooperate with the valve construction in overcoming difficulties, which naturally arise in providing a combination valve of the type described. The main and auxiliary stems 45 and 55, are of course susceptible of relative adjustment to adapt the valve member C for a variety of uses, which will be obvious to one skilled in the art to which this invention pertains.

Various changes in the shape, size and arrangement of parts may be made to the form of the invention herein shown and described, without departing from the spirit of the invention or the scope of the claims.

I claim:

1. A valve construction comprising a casing provided with an annular valve seat therein, projections extending into the opening surrounded by said seat and forming guide ways, and a valve member adapted for cooperation upon said valve seat, said valve member having lugs projecting therefrom for reciprocation within the guide ways of said seat for guide purposes.

2. A valve construction comprising a casing having inlet and outlet ports therein, and provided with a partition therein having a circular opening forming a valve seat the wall surrounding said circular opening being provided with projecting lugs extending inwardly thereof to provide guide ways, a detachable cap member in said casing, a bonnet structure in said casing, a valve member including projecting portions adapted for engagement in said guide ways, whereby the same is reciprocated intermediate said seat and said detachable cap, and valve regulating means in said bonnet.

3. A valve construction comprising a casing provided with an annular valve seat therein, a valve member for cooperation on said seat, a main stem adjustable in said casing to permit the valve to act as a check valve or for lifting said valve member off its seat, an auxiliary stem reciprocable in said main stem and adapted to be detachably connected to said valve member, said main and auxiliary stems adapted for co-acting to lock said valve member in closed position in said casing when the auxiliary stem is connected to the valve member.

4. A valve construction, comprising a casing, a valve member in said casing having a screw threaded socket, a bonnet on said casing having a screw threaded opening therein, a hollow main stem adapted for adjustably engaging the screw threaded portion of said bonnet, said main stem separate from said valve member and having an enlarged head on one end thereof adapted for seating against said bonnet to provide a leak proof structure and having in said end interior screw threads, an auxiliary stem adapted for reciprocation within said main stem, said auxiliary stem having an inner end thereof provided with screw threads adapted to engage in the screw threaded portion of said main stem to lock said stems together, said screw threaded portion of the the auxiliary stem likewise adapted for engagement in the screw threaded socket of said valve member, and means on said main and auxiliary stems, whereby said valve member when engaged by said auxiliary stem is adapted to be locked in closed position.

5. A valve construction comprising a casing, a valve member operable in said casing, a bonnet carried by said casing providing an interiorly screw threaded opening therein, a hollow main stem in screw threaded adjustment with the screw threaded opening of said bonnet, said main stem adapted to be adjusted upwardly whereby to lift the valve member off its seat in said casing or to be adjusted in said bonnet whereby the valve may coact in the casing as a check valve, an auxiliary stem slidably mounted in the main stem, and means for detachable connection of the auxiliary stem to said valve.

ROBERT A. HERA.